United States Patent
Park et al.

(10) Patent No.: US 10,065,451 B2
(45) Date of Patent: Sep. 4, 2018

(54) DRIVING WHEEL FOR VEHICLES

(71) Applicants: Donghyun Park, Seoul (KR); Daniel Wontae Choi, Seoul (KR); Taehyung Lee, Seoul (KR); Hanghun Choi, Seoul (KR)

(72) Inventors: Donghyun Park, Seoul (KR); Daniel Wontae Choi, Seoul (KR); Taehyung Lee, Seoul (KR); Hanghun Choi, Seoul (KR)

(*) Notice: Subject to any disclaimer, the term of this patent is extended or adjusted under 35 U.S.C. 154(b) by 647 days.

(21) Appl. No.: 14/641,140

(22) Filed: Mar. 6, 2015

(65) Prior Publication Data

US 2016/0257165 A1 Sep. 8, 2016

(51) Int. Cl.
| | |
|---|---|
| *B62M 6/75* | (2010.01) |
| *B60B 27/00* | (2006.01) |
| *B60K 7/00* | (2006.01) |
| *F16H 1/22* | (2006.01) |
| *B60K 1/04* | (2006.01) |

(52) U.S. Cl.
CPC .......... *B60B 27/0021* (2013.01); *B60K 1/04* (2013.01); *B60K 7/0007* (2013.01); *F16H 1/222* (2013.01); *B60B 2900/10* (2013.01); *B60K 2001/045* (2013.01); *B60K 2007/003* (2013.01); *B60Y 2200/13* (2013.01)

(58) Field of Classification Search
CPC .................................................. B60K 7/0007
USPC ...................................................... 180/65.51
See application file for complete search history.

(56) References Cited

U.S. PATENT DOCUMENTS

| | | | | |
|---|---|---|---|---|
| 3,915,250 | A * | 10/1975 | Laden ................... | B62K 11/10 180/206.8 |
| 4,270,622 | A * | 6/1981 | Travis ..................... | B60K 1/02 180/65.285 |
| 5,584,562 | A * | 12/1996 | Geran ....................... | B62J 6/20 362/473 |
| 5,735,363 | A * | 4/1998 | Horovitz ................ | A61G 5/045 180/206.8 |
| 5,755,304 | A * | 5/1998 | Trigg ...................... | B62M 6/60 180/206.1 |
| 5,857,537 | A | 1/1999 | Matsumoto et al. | |
| 6,922,004 | B2 * | 7/2005 | Hashimoto ........... | H02K 7/116 180/65.51 |
| 8,538,615 | B2 | 9/2013 | Chen et al. | |
| 2003/0193250 | A1 * | 10/2003 | Maslov .................. | H02K 1/141 310/68 R |

(Continued)

FOREIGN PATENT DOCUMENTS

| | | |
|---|---|---|
| KR | 10-2014-0038057 A | 3/2014 |
| WO | 03/097437 A1 | 11/2003 |
| WO | 03/098039 A2 | 11/2003 |

*Primary Examiner* — Tony H Winner
*Assistant Examiner* — Conan D Duda
(74) *Attorney, Agent, or Firm* — Novick, Kim & Lee, PLLC; Jae Youn Kim

(57) ABSTRACT

An electrically motorized driving wheel for vehicles such as bicycles is provided. The electrically motorized wheel can include a wheel rim, a housing disposed inside and connected to the wheel rim, wherein the housing defines an installation space inside the housing, a driving force generating mechanism disposed in the installation space, and a driving force transfer mechanism connected to the driving force generating mechanism and configured to transfer a driving force generated from the driving force generating mechanism to the housing.

15 Claims, 3 Drawing Sheets

(56) References Cited

U.S. PATENT DOCUMENTS

| | | | | |
|---|---|---|---|---|
| 2004/0000445 A1* | 1/2004 | Smith | B60K 7/0007 | 180/308 |
| 2005/0016785 A1* | 1/2005 | Young | B62M 6/60 | 180/206.5 |
| 2006/0090340 A1* | 5/2006 | Fleytman | B23F 9/025 | 29/893.3 |
| 2007/0126284 A1* | 6/2007 | Swain | B60K 6/12 | 303/152 |
| 2008/0066980 A1* | 3/2008 | James | B60K 7/0007 | 180/65.51 |
| 2008/0093913 A1* | 4/2008 | Katsaros | B62M 6/65 | 301/1 |
| 2009/0038081 A1* | 2/2009 | Berton | B25G 1/005 | 7/100 |
| 2010/0138127 A1* | 6/2010 | Boughtwood | B60L 7/006 | 701/71 |
| 2011/0133542 A1* | 6/2011 | Ratti | B60B 1/003 | 301/6.5 |
| 2012/0080934 A1* | 4/2012 | Lo | A61G 5/04 | 301/6.5 |
| 2012/0083376 A1* | 4/2012 | Lo | B60K 1/04 | 475/149 |
| 2012/0192784 A1* | 8/2012 | Gimlan | H02K 7/025 | 116/200 |
| 2013/0284527 A1* | 10/2013 | Murakami | B60L 7/18 | 180/55 |
| 2013/0288841 A1* | 10/2013 | Yoshino | B60K 7/0007 | 475/149 |
| 2013/0313930 A1* | 11/2013 | Fuchs | B62M 6/65 | 310/83 |
| 2014/0008964 A1* | 1/2014 | Zanfei | B62M 6/65 | 301/6.5 |
| 2014/0219848 A1* | 8/2014 | Rabhi | F16C 33/306 | 418/24 |
| 2015/0133253 A1* | 5/2015 | Huang | B62M 6/65 | 475/149 |
| 2015/0239527 A1* | 8/2015 | Huang | B60K 7/0007 | 475/149 |
| 2015/0266542 A1* | 9/2015 | Marioni | H02K 7/14 | 180/62 |
| 2015/0298537 A1* | 10/2015 | Duhamel | H02K 5/10 | 301/6.5 |
| 2016/0014252 A1* | 1/2016 | Biderman | B60L 15/20 | 455/420 |
| 2016/0068016 A1* | 3/2016 | Winshtein | B60G 3/01 | 301/6.5 |
| 2016/0068223 A1* | 3/2016 | Zanfei | B62M 6/50 | 301/6.5 |
| 2016/0075175 A1* | 3/2016 | Biderman | A61B 5/222 | 301/6.5 |
| 2016/0075177 A1* | 3/2016 | Biderman | B60L 3/003 | 301/6.5 |
| 2016/0075226 A1* | 3/2016 | Biderman | A61G 5/04 | 301/6.5 |
| 2016/0082772 A1* | 3/2016 | Biderman | A61G 5/045 | 301/6.5 |
| 2016/0114677 A1* | 4/2016 | Engelberg | B60K 7/0007 | 301/6.5 |
| 2016/0243927 A1* | 8/2016 | Biderman | B60K 7/0007 | |
| 2016/0325585 A1* | 11/2016 | Hays | A61G 5/1054 | |
| 2017/0225562 A1* | 8/2017 | Huang | B60K 17/046 | |
| 2017/0225684 A1* | 8/2017 | Alshamrani | B60W 30/18145 | |

* cited by examiner

DRIVING WHEEL FOR VEHICLES

BACKGROUND OF THE DISCLOSURE

1. Field of the Disclosure

The present disclosure relates to a driving wheel for vehicles. In particular, the present disclosure is directed to an electrically motorized wheel for bicycles.

2. Description of the Related Art

Bicycles are used generally for short distance transportation means. Traditionally, they ride conventional bicycles for leisure, exercises and hobbies. Recently, they started to ride motorized bicycles driven by electric motors for a longer distance or to save physical energy. A conventional motorized bicycle can be driven by an electric motor installed on the front or rear wheel. In order to efficiently and safely transfer driving force generated from a driving unit having a motor and gears to the rotational force of the wheels, a lot of research and development activities have been made. Korean Patent Application Publication 10-2014-0038057 discloses a driving unit for bicycles but this prior driving unit is not energy efficient and cost efficient.

One or more objectives of the present disclosure is to provide an electrically motorized wheel for bicycles, which is energy efficient and can be manufactured for a low cost, and moreover can be applicable to wheel chairs, baby carriages and any types of two-wheel vehicles as well, and can be provided with a replaceable battery.

SUMMARY OF THE DISCLOSURE

Aspects of the present disclosure provide an electrically motorized wheel for vehicles. Additional aspects will be set forth in part in the description which follows and, in part, will be apparent from the description, or may be learned by practice of the presented embodiments.

According to an aspect of the present disclosure, an electrically motorized wheel for a vehicle is provided. The electrically motorized wheel includes a wheel rim; a housing disposed inside and connected to the wheel rim, wherein the housing defines an installation space inside the housing; a driving force generating mechanism disposed in the installation space; and a driving force transfer mechanism connected to the driving force generating mechanism and configured to transfer a driving force generated from the driving force generating mechanism to the housing.

According to an embodiment of the present disclosure, the electrically motorized wheel further includes a controller disposed in the installation space and electrically connected with the driving force generating mechanism; and a power source to provide electric power to the controller and the driving force generating mechanism.

According to an embodiment of the present disclosure, the electrically motorized wheel is configured to be detachably attached to the wheel rim.

According to an embodiment of the present disclosure, the electrically motorized wheel is for a bicycle.

According to an embodiment of the present disclosure, the housing of the electrically motorized wheel includes a right side wall and a left side wall and at least one opening located on one of the right and left side walls such that at least one of the driving force generating mechanism and the power source can be replaced through the at least one opening.

According to an embodiment of the present disclosure, the housing includes at least one cover for covering the at least one opening, and the at least one cover includes a fastener for detachably attaching the at least one cover to the housing.

According to an embodiment of the present disclosure, the driving force generating mechanism includes a first motor and a second motor.

According to an embodiment of the present disclosure, the installation space includes a first installation space for disposing the first motor, a second installation space for disposing the second motor, and a third installation space for disposing the power source.

According to an embodiment of the present disclosure, the housing includes a plurality of openings for circulating air into the housing, the plurality of opening being disposed on at least one of a right side wall and a left side wall thereof.

According to an embodiment of the present disclosure, both of the first motor and second motor are configured to drive at the same time.

According to an embodiment of the present disclosure, the first motor, the second motor and the power source have the same weight.

According to an embodiment of the present disclosure, the driving force transfer mechanism is disposed at the center of the housing, and the first motor, the second motor and the power source are disposed in three different radial directions.

According to an embodiment of the present disclosure, the driving force transfer mechanism includes a shaft connected to a frame of the vehicle and a plurality of gears configured to transfer the driving force to the housing.

According to an embodiment of the present disclosure, the shaft is coupled with a right portion of the housing through a first bearing located therebetween, and is also coupled with a left portion of the housing through a second bearing located therebetween.

According to an embodiment of the present disclosure, wherein the plurality of gears includes a first pinion gear driven by the first motor, a second pinion gear driven by the second motor, and a third pinion gear engaging with the first and second pinon gears, and wherein the third pinon gear is fixed to the shaft which is connected to a frame of the vehicle and thus the housing is driven by the combined force of the first and second pinion gears.

According to an embodiment of the present disclosure, the power source is a replaceable battery.

According to an embodiment of the present disclosure, the housing includes a first prong for defining a first installation space, a second prong for defining a second installation space and a third prong for defining a third installation space, each one end of the prongs being connected to the rim; the first, second and third prongs are arranged in three different radial directions; the driving force generating mechanism includes a first motor disposed in the first installation space and a second motor disposed in the second installation space; a battery is disposed in the third installation space; the housing includes a central installation space for disposing the driving force transfer mechanism including a first pinion gear driven by the first motor, a second pinion gear driven by the second motor, and a third pinion gear connected to the shaft; the first and second gears engage with the third gear; the housing is driven by the combined force of the first and second pinion gears when the first and second gears are driven by the first and second motors respectively; and the shaft is coupled with a right portion of the housing through a bearing and with a left portion of the hosing through another bearing such that the housing drives the motorized wheel.

According to another aspect of the present disclosure, a driving housing configured to be detachably attached to a wheel rim for a vehicle is provided. The driving housing can include a first motor for driving a first pinion gear located inside the driving housing and fixed to the driving housing; a second motor for driving a second pinion gear slantly facing the first pinion gear, located inside the driving housing and fixed to the driving housing; a third pinion gear located between the first and second motors, wherein the third pinion gear is engaged with the first and second pinion gears, and the combined driving force of the first and second pinion gears is applied to the third pinion gear; and a shaft fixed to the third pinion gear at the center of thereof and perpendicular to the axes of the first and second pinon gears, wherein the shaft and the third pinion gear are fixed to a frame of the vehicle, and wherein the driving housing including the first and second motors rotates with respect to the fixed shaft when the first and second pinion gears are driven by the first and second motors respectively. Further, the driving housing has a bearing located between the driving housing and the shaft.

Some of advantages of the present disclosure is that the electrically motorized wheel is configured such a way that it can be installed on a conventional bicycle by replaced a wheel with the present motorized wheel so that cost can be saved. Further, the energy efficiency of the wheel is superior to a prior wheel driven by a single motor as it is driven by the combined force of the duel motors including the first and second motors. Further, it is easier to replace the battery as the hosing includes an opening and a cover for the opening and through which the battery can be replaced. Further, since the two motors are included in the motorized wheel, the wheel can be driven even if one motor does not work.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

DETAILED DESCRIPTIONS OF THE DISCLOSURE

Figure 1:
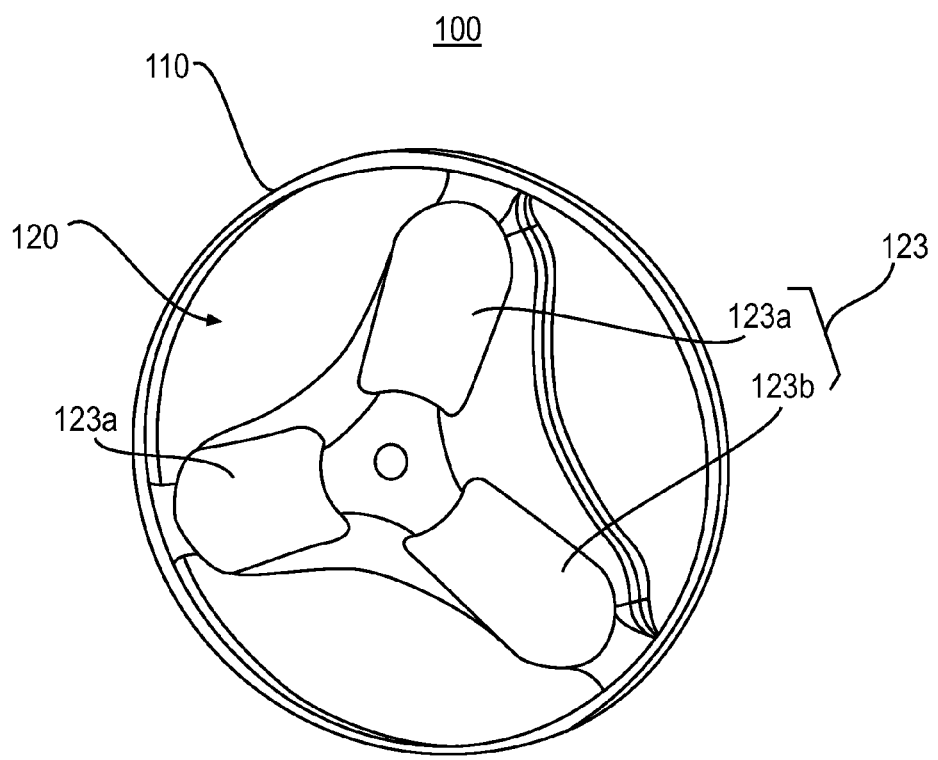
FIG. 1 is a perspective view of a wheel for a vehicle according to an embodiment of the present invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. Terms used herein are for descriptive purposes only and are not intended to limit the scope of the invention. The terms "comprises" and/or "comprising" are used to specify the presence of stated elements, steps, operations, and/or components, but do not preclude the presence or addition of one or more other elements, steps, operations, and/or components. The terms "first", "second", and the like may be used to describe various elements, but do not limit the elements. Such terms are only used to classify one element from another.

Figure 2:
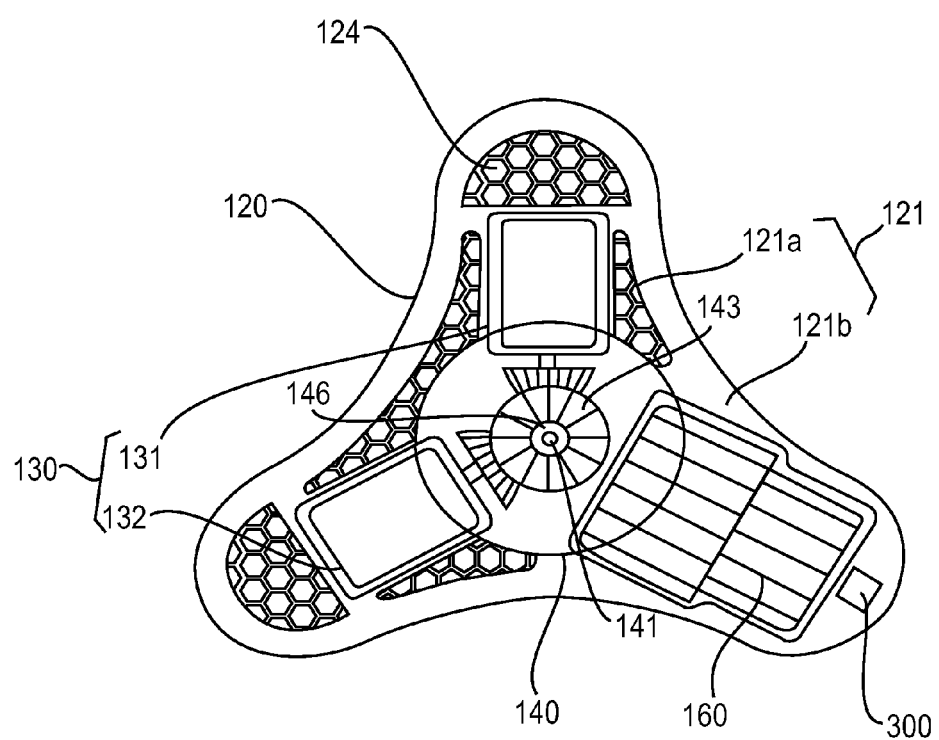
FIG. 2 is a sectional view of the embodiment of FIG. 1.

These and/or other aspects will become apparent and more readily appreciated from the following description of embodiments of the present invention, taken in conjunction with the accompanying drawings of which:

Referring to FIGS. 1 and 2, an electronically motorized wheel (100) for a vehicle is provided. In a preferred embodiment, the vehicle can be bicycles but can include any types of vehicles such as wheel chairs for patients and disabled persons, baby carriers, two-wheel vehicles and electric carts and the like. The electrically motorized wheel (100) includes a wheel rim (110) which can be attached to a wheel tire of a bicycle, a housing (120) disposed inside and connected to the wheel rim (110) in which the housing defines an installation space (121) inside the housing (120), a driving force generating mechanism (130) disposed in the installation space (121), and a driving force transfer mechanism (140) connected to the driving force generating mechanism (130) and configured to transfer a driving force generated from the driving force generating mechanism (130) to the housing (120).

Further, the wheel (100) can include a controller (300) disposed in the installation space (121) and electrically connected with the driving force generating mechanism (130), and a power source (160) to provide electric power to the controller (300) and the driving force generating mechanism (130). For example, the power source (160) can be a replaceable battery or rechargeable battery.

As an example, the housing (120) is configured to be detachably attached to the wheel rim (110). The housing (120) includes a right side wall and a left side wall and at least one opening located on one of the right and left walls such that at least one of the driving force generating mechanism (130) and the power source (160) can be replaced through the at least one opening. The wheel rim (110) can be in a ring shape and can be coupled with a conventional wheel tire. In an embodiment, the housing (120) can be an integral part of the wheel (100) so that the housing (120) and the wheel rim (110) can be integrally formed and manufactured using die casting, or can be a separate part from the wheel rim (110) so that it can be detachably connected to the wheel rim (110) through different types of connectors or fasteners. Thus, the housing (120) itself can work as a spoke that transfers rotating force to the wheel (100), and can be attachable to a conventional bicycle by users. As an example, the housing (120) can be connected to the wheel rim (110) by using bolts and nuts, and other types of known fasteners.

The driving force generating mechanism (130) includes a dual motor system including a first motor (131) and a second motor (132) which is capable of driving a bicycle electrically without manpower. One advantage of this dual motor configuration of the motorized wheel (100) is to drive the bicycle even in an emergency situation where one of the first and second motors is broken. Alternatively, the driving force generating mechanism can be used to assist a user using his manpower to drive the bicycle. The installation space (121) includes a first installation space (121a) for disposing the first motor (131), a second installation space (121b) for disposing the second motor (132), and a third installation space (121c) for disposing the power source (160). In other words, the housing (120) includes a first prong for defining the first installation space (121a), a second prong for defining the second installation space (121b) and a third prong for defining the third installation space (121c), each one end of the prongs being connected to the wheel rim (110), in which the first, second and third prongs are arranged in three different radial directions. The first, second and third installation spaces (121) are independently arranged so that the parts installed inside the housing (120) including the first and second motors (131, 132), the driving force transfer mechanism (140), the battery (160) and the controller (300) will be disposed inside the housing (120) without unnecessary interferences, and it will be easier for the user to replace such parts. The housing (120) further can include different types of sensors such as a sensor for monitoring the rpm or output torque of the motors, the output torque of the bicycle and the speed of the bicycle, and a wireless communication unit so that such rpm of the motors can be wirelessly controlled. For example, the sensor can read the rpm of the wheel (100) or the torque of the bicycle, and the controller (300) can control the speed of the motors based on such rpm of the wheel or the torque of the bicycle. As another example, the housing (120) can have a wireless electronic device such as Bluetooth® so that the user can control the speed of the motors wirelessly using a remote controller. Alternatively, the controller (300) can be installed on a place adjacent to the handle of the bicycle to control the motors. As another example, the bicycle can have a control switch to turn on or off the electric power from the battery (160) to the motors, which can be installed onto the handle or another part of the bicycle which can be conveniently accessed by the user.

In an embodiment, the housing (120) has an opening for replacing a battery (160) and a cover (123b) for covering the opening disposed on one side wall of the housing (120). Further, the housing (120) has two other openings for replacing a first motor (131) and a second motor (132) respectively and located on the same side wall of the housing (120), and two covers (123a) for covering the two openings respectively. The covers (123) are configured to protect the installation space (121) from outside, and may have a fastener for detachably attaching the covers (123) to the housing (120). The fastener can be very different types. For example, each of the covers (123) may have a hook located at one or more ends thereof which can be coupled with one or more holes or openings located on the side wall of the housing (120). Alternatively, one or more holes or openings can be formed in the covers (123) and one or more hooks can be formed in the side wall of the housing (120) so that the covers (123) can be detachable by the users to replace the motors (131, 132) and battery (160).

Further, the housing (120) includes a plurality of openings (124) for circulating air into the installation space (121) of the housing (120), and the plurality of openings (124) are disposed on one of a right side wall and a left side wall thereof. For example, the plurality of openings (124) are disposed on one side wall of the housing (120) and the covers (123) are disposed on another side wall of the housing (120) so that the heat generated from the motors and gears can be air cooled. Also, the plurality of openings (124) may be provided on both side walls of the housing (120).

Further, both of the first motor (131) and second motor (132) are configured to drive at the same time and speed so that the combined driving force of the first motor (131) and the second motor (132) can be maximized and energy efficient. Also, the first motor (131) and the second motor (132) and the power source (160) have the same weight so that the centrifugal force of the rotating housing and wheel (100) can be distributed equally into the radial directions thereof and that the center of gravity would not be eccentric. The motorized wheel (100) may have weight adjusters disposed inside the housing (120) or on the wheel rim (110) to adjust the rotating wheel balance.

Further, the driving force transfer mechanism (140) is disposed in the middle portion of the housing (120), and the first motor (131), the second motor (132) and the power source (160) are disposed in three different radial directions as shown in FIG. 2. For example, the first motor (131), the second motor (132) and the power source (160) can be disposed in three different directions with a 120 degree angle.

Figure 3:
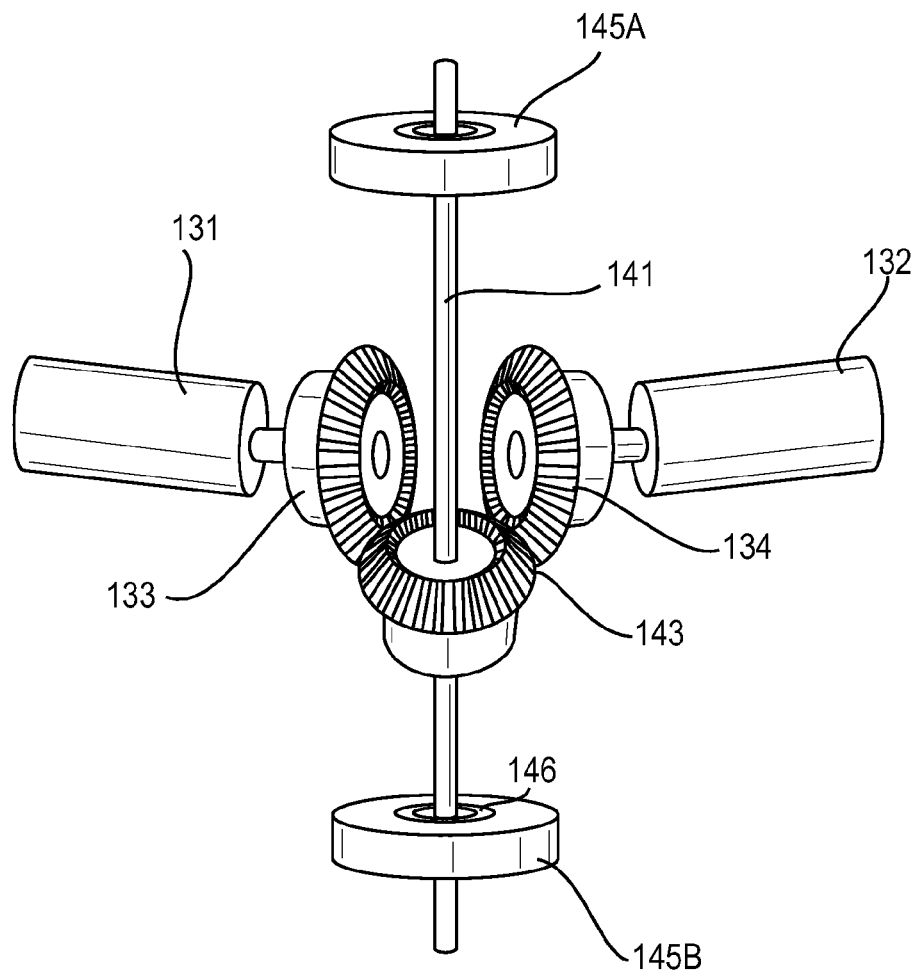
FIG. 3 is a detailed perspective view of a driving force transfer mechanism of the embodiment of FIG. 1.

Referring to FIG. 3, the driving force transfer mechanism (140) further includes a shaft (141) connected to a third pinion gear (143) and also connected to the frame of the bicycle. The driving force transfer mechanism (140) is configured to transfer the driving force to the housing (120) in which one portion of the shaft (141) is coupled with a right side portion (145a) of the housing (120) through a bearing (146), and another portion of the shaft (141) is coupled with a left portion (145b) of the housing (120) through another bearing (146).

As an example, the driving force transfer mechanism (140) includes a first pinion gear (133) driven by the first motor (131), a second pinion gear (134) driven by the second motor (132), and a third pinion gear (143) engaging with the first and second pinon gears (133, 134) and connected to the shaft (141). The housing (120) also defines a central installation space for disposing the driving force transfer mechanism (140). In other words, the housing (120) includes the driving force transfer mechanism (140) that is disposed in the middle portion of the housing (120), connected to and driven by the first and second motor (131, 132), and transfers the combined force to the third pinion gear (143) and then to the shaft (141) which is fixed to the frame of the bicycle, such that the housing (120) and the motorized wheel (100) can be rotated. The first and second pinion gears (133, 134) are used as input gears and the third pinon gear (143) is used as an output gear driven by the combination of the first and second gears (133, 134), in which the output gear, the third pinion gear (143), does not rotes but is connected to the fixed shaft (141), and thus the housing (120) with the first and second motors (131, 132) rotates with respect to the shaft (141) and third pinion gear (143) so as to drive the wheel rim (110) of the bicycle. The shaft (141) is fixed to the third pinion gear (143) at the center thereof and is arranged perpendicularly to the axes of the first and second pinion gears (133, 134). Further, the driving force transfer mechanism (140) has a bearing (146) located between the shaft (141) and a left portion (145A) and a right portion (145B) of the housing (120). The driving force transfer mechanism (140) is not limited to the pinion gear type but can be other types of gears as long as there are two input gears connected to the housing and one output gear engaged with the input gears and fixed to the shaft of the frame of the bicycle such that the housing is driven by the combined force of the input gears.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A driving wheel for a vehicle, the driving wheel comprising:
   a wheel rim;
   a housing connected to the wheel rim, wherein the housing defines an installation space inside the housing and the installation spaces includes a first, a second, a third and a central installation spaces;
a driving force generating mechanism disposed in the installation space; and
a driving force transfer mechanism connected to the driving force generating mechanism and configured to transfer a driving force generated from the driving force generating mechanism to the housing,
wherein the housing includes a first prong for defining the first installation space, a second prong for defining the second installation space and a third prong for defining the third installation space, each one end of the prongs being connected to the rim,
wherein the first, second and third prongs are arranged in three different radial directions,
wherein the driving force generating mechanism includes a first motor disposed in the first installation space and a second motor disposed in the second installation space,
wherein a battery is disposed in the third installation space,
wherein the central installation space is configured for disposing the driving force transfer mechanism including a first pinion gear driven by the first motor, a second pinion gear driven by the second motor, and a third pinion gear connected to a shaft,
wherein the first and second pinion gears engage with the third pinion gear,
wherein the housing is driven by a combined force of the first and second pinion gears when the first and second gears are driven by the first and second motors, and
wherein the shaft is connected to a right side wall of the housing through a bearing and with a left side wall of the housing through another bearing such that the housing is configured to drive the motorized wheel.

2. The driving wheel of claim 1, further comprising:
a controller disposed in the installation space and electrically connected with the driving force generating mechanism; and
a power source to provide electric power to the controller and the driving force generating mechanism.

3. The driving wheel of claim 1, wherein the housing is configured to be detachably attached to the wheel rim.

4. The driving wheel of claim 1, wherein the vehicle is a bicycle.

5. The driving wheel of claim 1, wherein the housing includes at least one opening located on one of the right and left side walls of the housing such that at least one of the driving force generating mechanism and the power source can be replaced through the at least one opening.

6. The driving wheel of claim 5, wherein the housing includes at least one cover for covering the at least one opening.

7. The driving wheel of claim 6, wherein the at least one cover includes a fastener for detachably attaching the at least one cover to the housing.

8. The driving wheel of claim 1, wherein the housing includes a plurality of openings for circulating air into the housing, the plurality of openings being disposed on at least one of the right side wall and the left side wall thereof.

9. The driving wheel of claim 1, wherein both of the first motor and second motor are configured to drive at the same time.

10. The driving wheel of claim 9, wherein the first motor, the second motor and the power source have the same weight.

11. The driving wheel of claim 1, wherein the driving force transfer mechanism is disposed in the middle of the housing, and wherein the first motor, the second motor and the power source are disposed in three different radial directions.

12. The driving wheel of claim 1, wherein the driving force transfer mechanism includes the shaft connected to a frame of the vehicle.

13. The driving wheel of claim 2, wherein the power source is a replaceable battery.

14. A driving unit configured to be detachably attached to a wheel rim for a vehicle, the driving unit comprising:
a driving housing;
a first motor for driving a first pinion gear located inside the driving housing and fixed to the driving housing;
a second motor for driving a second pinion gear facing the first pinion gear, located inside the driving housing and fixed to the driving housing;
a third pinion gear located between the first and second motors, wherein the third pinion gear engages with the first and second pinion gears, and the combined driving force of the first and second pinion gears is applied to the third pinion gear; and
a shaft fixed to the third pinion gear at a center of the third pinion gear and disposed perpendicularly to the axes of the first and second pinon gears,
wherein the shaft and the third pinion gear are fixed to a frame of the vehicle, and
wherein the driving housing including the first and second motors rotates with respect to the fixed shaft and the third pinion gear when the first and second pinion gears are driven by the first and second motors respectively.

15. The driving unit of claim 14, further comprising a bearing located between the driving housing and the shaft.

* * * * *